Feb. 24, 1970  J. BOILEAU  3,496,984
PNEUMATIC TIRES
Filed July 24, 1967  3 Sheets-Sheet 1

INVENTOR
JACQUES BOILEAU
BY
HIS ATTORNEYS

Feb. 24, 1970 J. BOILEAU 3,496,984
PNEUMATIC TIRES
Filed July 24, 1967 3 Sheets-Sheet 2
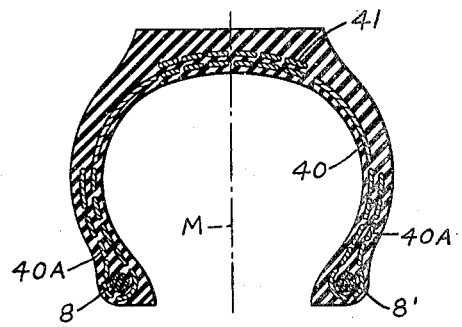
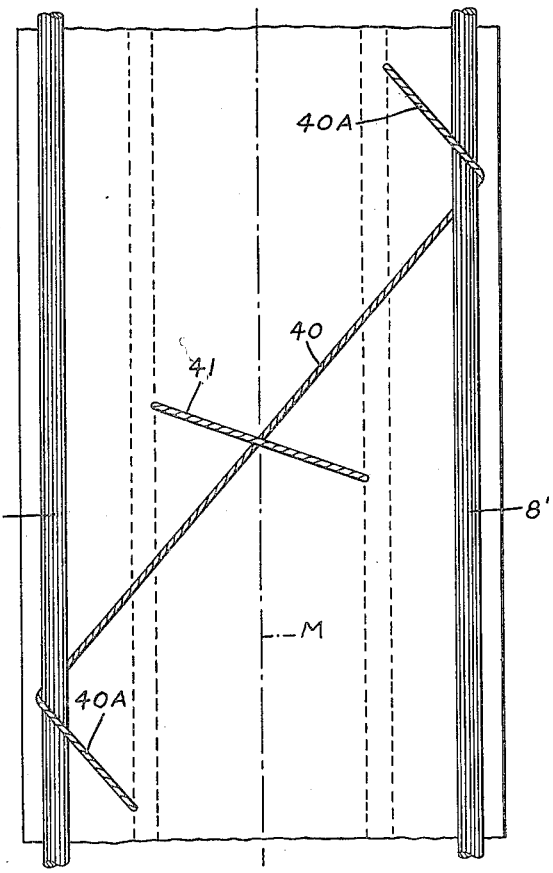
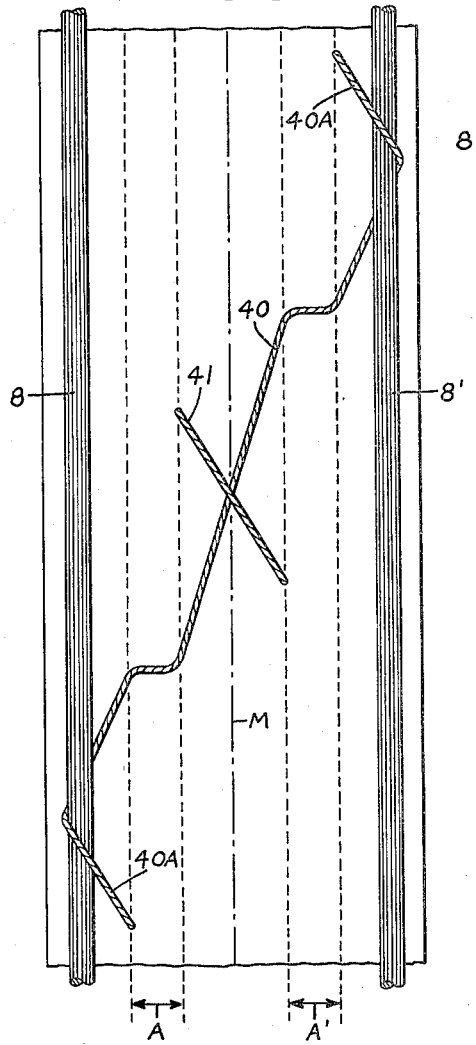
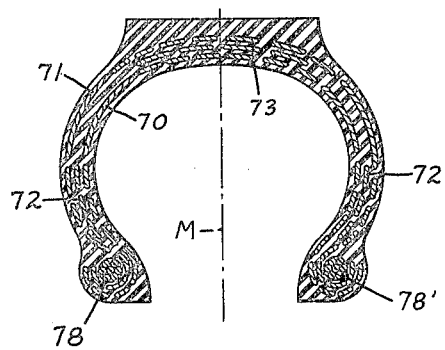
INVENTOR
JACQUES BOILEAU
BY
HIS ATTORNEYS

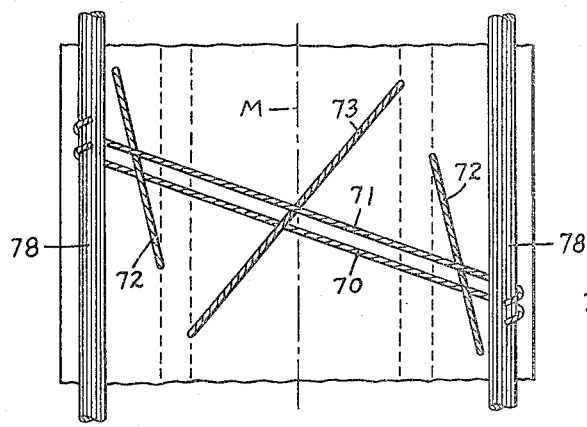
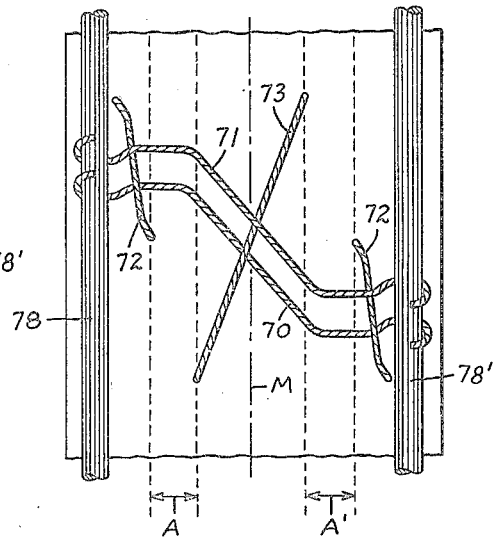
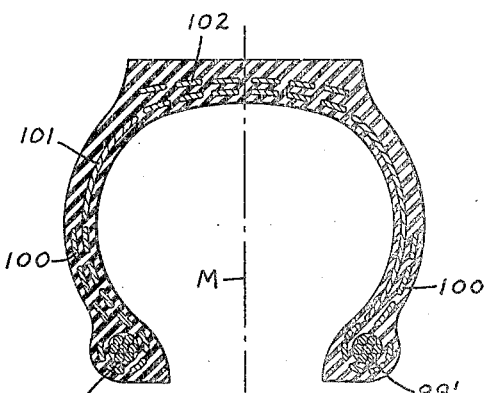
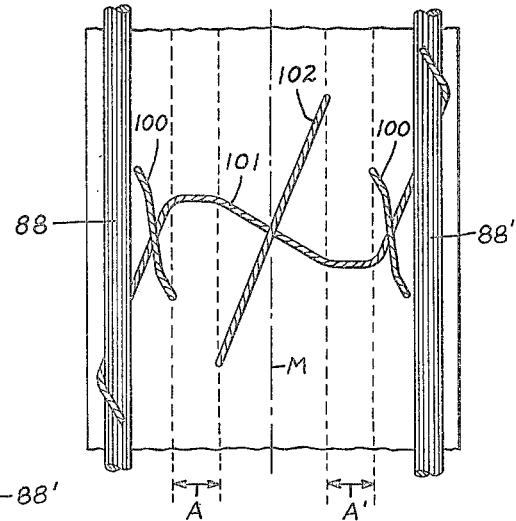
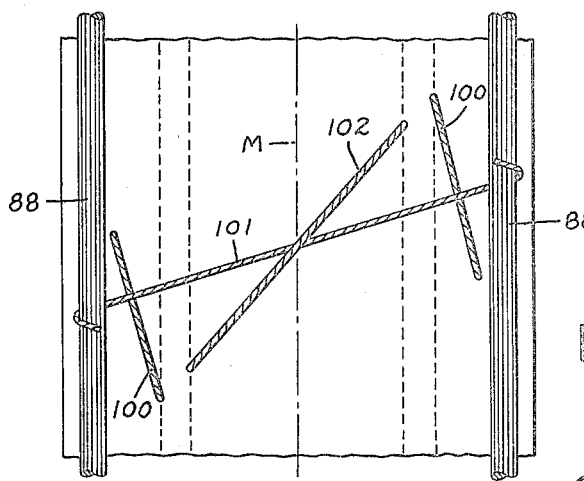

United States Patent Office 3,496,984
Patented Feb. 24, 1970

3,496,984
PNEUMATIC TIRES
Jacques Boileau, Clermont-Ferrand, France, assignor to Compagnie Generale des Etablissements Michelin, raison sociale Michelin & Cie, Clermont-Ferrand, Puy-de-Dome, France
Filed July 24, 1967, Ser. No. 655,499
Claims priority, application France, Aug. 1, 1966, 71,704
Int. Cl. B60c 9/10
U.S. Cl. 152—356   4 Claims

ABSTRACT OF THE DISCLOSURE

Pneumatic tires and tire casings containing carcass structures including (1) a carcass ply anchored at its opposite edges to the two bead wires with radial cords in the upper portion of the sidewalls and oblique ones elsewhere, and crossed by a tread ply and by plies in the bead region, and (2) two partial carcass plies of cords which cross underneath the tread, extend radially in the upper part of the sidewalls and obliquely elsewhere and being crossed by plies in the bead zone of the sidewalls.

---

This invention relates to pneumatic tires and their manufacture, and more particularly to the manufacture of tires in which the cords of the reinforcing plies are disposed at selected angles relative to the circumferential direction of the tire.

Tires are described in Patent No. 3,327,753 dated June 27, 1967 which have a carcass composed of radial cords in the sidewalls and oblique cords in all or part of the region of the carcass which is covered by the tread. This patent also describes a means of manufacturing such covers by placing the carcass plies of cords radially on a building drum and modifying the inclination of the wires locally while being shaped into tire form by means of other plies consisting of cords inclined in different directions and superimposed on the carcass cords.

The present invention relates to improvements in tires of the type described and in their method of manufacture to obtain in a more economical and simpler manner tires which combine most of the favorable characteristics of bias ply tires, e.g., good stability of the track, improved behavior in curves and of radial ply tires, e.g., great radial flexibility, good resistance at great speeds, better road holding, little forward resistance, low wear and tear, and slight drift in response to transverse thrusts.

The tires in accordance with the invention comprise a reinforcement composed of crossed cords underneath the tread and in the portions of the sidewalls adjacent to the beads as well as radial cords in a portion of the sidewall adjacent to the tread, such reinforcement being characterized by cords extending uninterruptedly from the bead wires to the tread in an oblique direction in the zone of the sidewalls adjacent to the bead wires, in radial or substantially radial direction in the zone of the sidewall adjacent to the tread and oblique direction underneath the tread.

The terms "radial cords" and "radially placed cords" designate cords placed in radial planes, i.e., in planes passing through the axis of the tire.

Oblique cords or obliquely placed cords form with the direction of the median plane of symmetry an angle other than 90°, preferably substantially different from 90°. If such angle differs from 90° by not more than 10° or 15°, the cord, though oblique, may be likened to a radial cord. Normally, the oblique cords used in the tire form with the median plane an angle of less than 45° and can be as small as 10° or 15°.

One embodiment of the invention includes a carcass reinforcement consisting of cords anchored to the two bead wires and comprising five distinct zones: an oblique zone or partly oblique zone underneath the tread, two radial zones on each side of this oblique zone, and finally, two oblique zones in the region of the sidewalls containing the bead wires. The carcass cords are crossed underneath the tread by at least one ply of oblique cords. The same is true in the regions of the sidewalls adjacent to the beads where the carcass cords are oblique. However, in the bead region of the sidewalls, the carcass cords can be crossed by folded back portions of the edges of the carcass ply or plies.

A second embodiment of the invention includes a carcass including separate plies of cords, each extending through a sidewall and behind the tread, the cords of these plies being oblique behind the tread, radial in the sidewall portion adjacent to the tread and oblique in the sidewall portion containing the beads. In this modification, each tread-reinforcing ply constitutes the reinforcement of one of the sidewalls. In the sidewalls in the vicinity of the beads, the cords of the ply reinforcement are oblique, and are crossed either by separate plies of cords which are likewise oblique or by portions of the reinforcing ply folded around the bead wire.

The two basic carcass structures in accordance with the invention are: (1) a carcass ply anchored at its opposite edges to the two bead wires with radial cords in the upper portion of the sidewalls and oblique ones elsewhere, and crossed by a tread ply and by plies in the bead region, and (2) two partial carcass plies which cross underneath the tread and protect each of the sidewalls, with radial cords in the upper part of the sidewalls and oblique ones elsewhere, crossed by bead plies.

Many variations of these carcass structures are possible. In particular, changes may be provided for the direction of the carcass cords, additional plies of cords can be superimposed either in at least one of the sidewalls or in the tread zone, or also in the sidewalls and in the tread zone, or in part of the former and/or the latter.

The method of manufacturing of the tires in accordance with the invention consists in building a cylindrical sleeve on a tire building drum containing one or more carcass plies having cords oblique or on a bias relative to the generating lines of the cylinder and on which are assembled in the regions corresponding to the tread zone and to the part of the sidewall containing the bead, deforming plies having cords which cross the carcass wires, and in shaping the sleeve thus formed into the toroidal shape of a tire.

It will be understood that the improvement over the technique disclosed in Patent No. 3,327,753 is that in the sleeve formed, the carcass cords are disposed obliquely instead of radially and both the center (tread) part and the ends (bead area) of the carcass wires are deformed or shifted by other plies of inclined cords which causes the oblique portions of the carcass cords in the sidewalls adjacent to the edges of the tread to shift into radial positions.

If a carcass is formed a ply of oblique cords which are not crossed, i.e., for example, a carcass consisting of a single ply of parallel non-radial cords, these oblique wires have a tendency to assume radial positions if the bead wires to which the ends of the cords are allowed to rotate with respect to each other, and if the cords are under sufficient tension. The same action occurs if narrower deforming or adjusting plies utilized in given locations but such adjusting plies can either brake the movement of the carcass cords towards radial positions, or even force a change in inclination in the opposite direction.

The inclinations of the cords depend upon the starting parameters, that is, the angle at which the cords are laid, the position and width of the various plies, the profile the tire sleeve is given when it is formed, and the degree of freedom given the bead wires to turn around the axis of the sleeve during shaping into a torus. The choice of starting parameters required to obtain a given structure and form can be calculated analytically, analogically or graphically with knowledge of the law of local elongation of the rhombic network in each point of the meridian the curvilinear abscissa of which, measured from the bead wire, is a known function of the distance of this point from the axis of rotation of the tire. However, in addition to the theoretical deformation, sliding or slipping of plies occurs, especially in the vicinity of the ends of the setting plies. The exact choice of the starting parameters required to obtain a given result must therefore to a certain extent be determined empirically. The exaples set forth hereinafter contain precisely started and calculated cases.

Inasmuch as in the method according to the invention, the carcass wires initially are oblique and not radial, it is possible to have a partial carcass ply covering a single sidewall and the tread zone assume the role of a deforming or adjusting ply for another partial carcass ply covering the other sidewall and the tread zone, which obviously would not be possible with radial carcass wires.

There is a double advantage in using obliquely placed carcass wires in the rough sleeve to be formed, in place of radial wires. Firstly, one more parameter becomes available, i.e., the angle at which the carcass wires are laid, in order to obtain a desired network. The angle of laying may be chosen in such a manner as to cause a deformation which is locally smaller than the deformation of radial wires used in the tire sleeves from which the desired final configuration is obtained. For example, the deformation which can be obtained in the vicinity of the bead wire is, of necessity, small, inasmuch as during shaping, the variation of the diameter of the tire is smaller as the region concerned is closer to the bead wire, since the bead wire maintains its initial diameter. By using radial wires in the sleeve to be shaped into the rough tire, the wires will tend to remain radial in the vicinity of the bead wire while it would be desirable for them to assume a more pronounced inclination in relation to the meridian. By using oblique wires, it is much easier to obtain the preferred inclination for the reason that the wires are initially inclined in the desired direction.

The invention will be better understood by reference to the accompanying drawings, wherein:

FIGURES 4, 5 and 6 are views corresponding, respectively, to FIGURES 1, 2 and 3 disclosing a modified form of tire embodying the invention;

Figure 1:
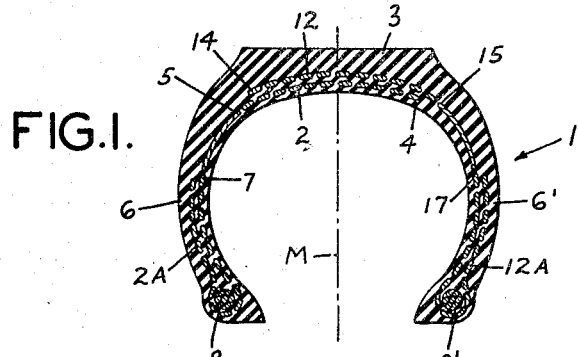
FIGURE 1 is a schematic radial cross-sectional view of a tire embodying the invention.
Figure 2:
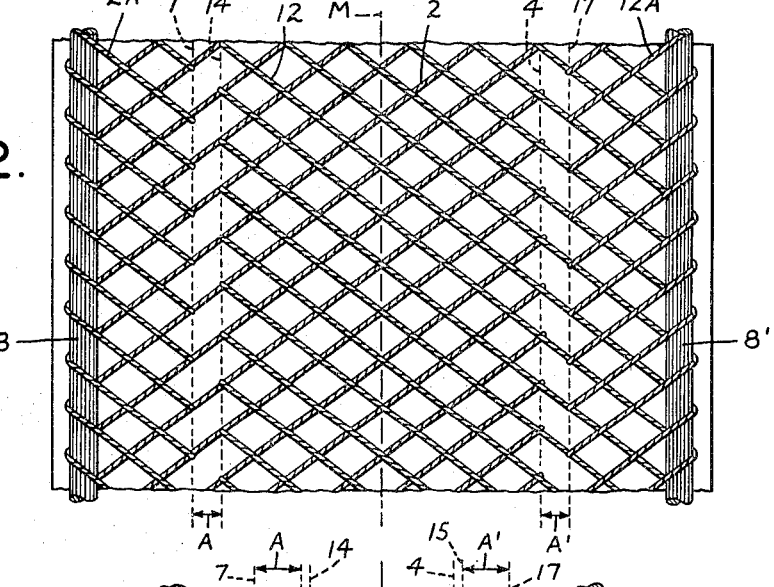
FIGURE 2 is a schematic plan view of the arrangement of the ply cords in a cylindrical sleeve built on a drum to produce the tire disclosed in FIGURE 1.
Figure 3:
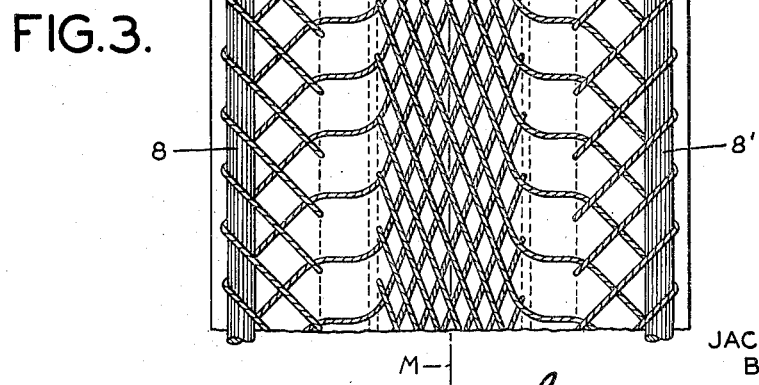
FIGURE 3 is a schematic, plan view of the arrangement of the cords after the cylindrical sleeve has been shaped to the tire form shown in FIGURE 1.

FIGURES 7, 8 and 9 are views corresponding, respectively, to FIGURES 1, 2 and 3 of still another form of tire in accordance with the invention; and FIGURES 10, 11 and 12 are views corresponding, respectively, to FIGURES 1, 2 and 3 of another form of tire in accordance with the invention.

In FIGURES 1, 4, 7 and 10, the cords of the reinforcement are shown in broken lines in the oblique portions while they are shown as continuous cords when they remain in the radial plane, i.e., in a plane passing through the axis of rotation of the tire. In FIGURES 2 and 3, the cords of the plies are shown widely spaced apart from one another only for the sake of clarity. In practice, they are much closer to one another.

In FIGURES 5, 6, 8, 9, 11 and 12, each ply is schematically shown by a single cord for the sake of simplicity. In all examples illustrated and described, the cords may be made of natural textile fiber, synthetic or artificial fiber, metal, glass, etc., as the materials of which they consist as well as their structure have no bearing upon the application of the invention.

As regards the angles referred to hereinafter, the values given are the values of the acute angles formed between the direction of the circumference of the cylindrical rough shape or of the tire and the cord concerned.

The tire 1 shown in FIGURE 1 includes a reinforcement consisting of a ply of cords 2 extending obliquely underneath the tread 3 from point 4 located to the right of the longitudinal median plane M as far as point 5 located to the left of plane M, in the zone wherein the sidewall 6 of the tire connects with the tread 3. From point 5 on, the cords 2 are no longer oblique; they are arranged in radial planes as far as point 7 located almost mid-height of the sidewall 6. Starting at that point, the cords 2 deviate from their radial planes as far as the annular bead wire or cable 8 located in the bead of the tire and around which they are folded back and extend into the sidewall in the vicinity of point 7.

The reinforcement of the tire 1 also includes a ply of cords 12, the path or course of which crosses and is symmetrical to that of the cords of the ply 2. Between the points 14 and 15, corresponding to points 4 and 5, the ply 12 is superimposed over the ply 2. In this example, the deforming plies consist of that portion of the ply 12 which covers a portion of the ply 2 and the folded-back parts 2A and 12A, respectively, of the ply 2 and of the ply 12.

In order to obtain the structure disclosed in FIGURE 1, a cylindrical rough tire body or sleeve containing the ply 2 is built on a cylindrical drum with the cords inclined obliquely relative to the direction of the circumference, or, differently expressed, to the median plane M which will be the median longitudinal plane of the finished tire. In the example shown, the cords 2 are inclined at an angle of 53° towards the right.

The ply 2 is folded back around the ring-shaped bead wire 8 with the cords of the folded portions forming then with the direction of the circumference an angle of 53° towards the left. The circumferential edge 4 of the ply 2 is located to the right of the plane M which is equidistant from the two bead wires 8 and 8' while the edge 7 of the folded-back portion 2A is located to the left of the plane M. A ply 12 is placed on top of the ply 2 symmetrically with respect to the plane M, with the edge 14 located to the left of the said plane from which it is separated by the same distance as the edge 4 of the ply 2. The edge 17 of the folded-back part 12A of the ply 12 is located to the right of the plane M from which it is separated by the same distance as the edge 7 of the ply 2. The cords of the ply 12 form with the circumferential direction an angle of 53° and are directed towards the left while the wires of its folded-back part 12A are directed towards the right and form an angle of 53° with the circumferential direction.

After the usual strips or layers of rubber or other elastomer have been applied to the cylindrical sleeve for protection of the sidewalls 6 and the tread 3, the rough sleeve is expanded from its cylindrical shape into the shape of a finished tire, a radial cross-section of which is schematically shown in FIGURE 1. This shaping process causes a considerable increase in the length of the circumference of the rough tire and is at its maximum in the median plane M and is zero in the zone of the bead wires 8 and 8' which do not vary in diameter and can only approach each other and turn with respect to each other. In the course of shaping the tire, the angles formed by the cords with the direction of the circumference change and so do their paths, due to the effect of circumferential elongation and the progressive transverse contracting of the plies, as well as to the effect of the action exercised by the cords with respect to one another in the zones in which they are superimposed, i.e., in the zone between the bead wire 8 and the edge 7 of the folded-back part 2A, between the edge 14 of the ply 12 and the edge 4 of the ply 2, and between the edge 17 of the folded-back part 12A of the ply 12 and the bead wire 8'. In the zones in which the cords do not cross, i.e., in the zone A between the edges 7 and 14, and in the zone A' between the edges 4 and 17, the wires 2 and 12 have a tendency to assume a transversal direction, i.e., to position themselves in the radial planes, see FIGURE 3. In the zones in which the cords are crossed, they shift to an angle of approximately 20° with respect to the median plane M in the tread zone of an angle of approximately 40° in the lateral zones adjacent to the bead areas.

The three embodiments of the invention shown in FIGURES 4 to 12 also make use of the change of the angles of the wires, which is caused by the transition of the cylindrical shape of the rough tire to the toroidal shape of the finished tire in the manner explained in connection with FIGURES 1 to 3.

In the embodiment disclosed in FIGURES 4 to 6, the deforming or setting plies comprise a ply of cords 41 placed in the center of the ply of cords 40, and the folded-back parts 40A of the latter. In the rough cylindrical shape schematically shown in FIGURE 5, the cords of the ply 40 form with the longitudinal direction an angle of 44° with the circumferential direction with the cords inclined towards the left and crossing the cords of the ply 40, serving thus as deforming plies. In the zone of the median plane M which is the zone of the tread, the deforming ply consists of the ply 41, the cords of which form an angle of 70° with the longitudinal direction and are directed towards the left. FIGURE 6 shows the paths of the cords after shaping of the rough tire cylinder, into a torus. The directions of the cords of these two plies have not changed but the cords of ply 40 now form with the center zone a smaller angle relative to the direction of the circumference, measuring approximately 21°, and the cords of the ply 41 form in the same zone an angle of approximately 28° with the circumferential direction. In each of the intermediate zones A and A', the cords of the ply 40 come closer to a tranverse or radial direction, i.e., 90°. In this example, the bead wires 8 and 8' have turned circumferentially with respect to each other in the course of the shaping process.

FIGURES 7 and 9 illustrate a tire in which the reinforcement of the tire comprises two superimposed plies 70 and 71 extending without interruption from bead wire 78 to bead wire 78' and forming with the longitudinal direction an angle of 70° to the left in the rough cylinder shape. In this case, the deforming plies are placed between the two 70 and 71 plies so that the latter become deformed in the same manner. The deforming plies are the lateral plies 72 and the center ply 73, the cords of which form with the longitudinal direction an angle of 17° (ply 72) and 41° (ply 73). After shaping the tire, the cords are adjusted to the relation shown schematically in FIGURE 9. The cords are inclined in the center zone at an angle of 45°, in the two intermediate zones A and A' at an angle of 90° relative to the direction of the circumference. In the lateral zones, their shape in sinuous. The cords of the deforming ply 73 now form an angle of 22° with the direction of the circumference, those of the ply 72 an angle of 14°.

The tire shown in FIGURES 10 to 12 is different from that described with reference to FIGURES 4 to 6 in that different angles are chosen, and also, due to the fact that in the lateral zones, i.e., in the zones adjacent to the bead wires 88 and 88', the deforming ply consists of an independent ply 100, the cords of which are inclined to the direction of the circumference at an angle of 30° to the left. The cords of the main ply 101 are inclined an angle of 70° to the right and the cords of the center deforming ply 102 an angle of 55° likewise to the right. After shaping the tire, the angles of the cords of the main ply 101 are inclined 55° to the left in the center zone and close to 90° in the zones A and A'. In the lateral zones, they are inclined at an angle of approximately 30°. The cords of the ply 102 form an angle of 22° to the right, those of the plies 100 an angle of 14° to the left. The use of the deforming plies 100, consisting not only of the folded-back portions of the main ply around the bead wires but of independent plies, enables a wide variation in the directions and courses of the cords in these zones, which is not possible if the folded-back parts of the main ply serve to modify the direction and the course of the cords of such ply.

It is apparent that numerous other variations of the inclinations of the cords or portions thereof are possible. Thus, for example, the wires of the main ply or plies may be disposed so that they are not entirely oblique in the zone underneath the tread but instead may be disposed in radial planes over at least part of their lengths in the tread zone.

Accordingly, the embodiments described above should be considered as illustrative of the invention as defined in the following claims.

I claim:
1. A tire comprising a tread, sidewalls extending inwardly from opposite edges of said tread, beads at the inner edges of said sidewalls, bead wires in said beads, and a continuous carcass ply of reinforcing cords extending from one bead wire, through one sidewall, beneath the tread, and through the other sidewall to the other bead wire, said cords being non-radially inclined in a zone of each sidewall adjacent to the bead thereon, substantially radially directed in a zone of each sidewall adjacent to the tread, and oblique to the median plane of the tire beneath said tread, further comprising additional plies of cords in the zones where the cords of said continuous ply are non-radially inclined and obliquely directed, the cords of said additional plies being crossed with respect to the cords of said continuous ply.

2. A tire comprising a tread, sidewalls extending inwardly from opposite edges of said tread, beads at the inner edges of said sidewalls, bead wires in said beads, and a continuous carcass ply of reinforcing cords extending from one bead wire, through one sidewall, beneath the tread, and through the other sidewall to the other bead wire, said cords being non-radially inclined in a zone of each sidewall adjacent to the bead thereon, substantially radially directed in a zone of each sidewall adjacent to the tread, and oblique to the median plane of the tire beneath said tread, said continuous ply having a sidewall portion at each edge folded around the bead wire in each bead, the cords in said folded sidewall portions being crossed with respect to the non-radially inclined cords of said continuous ply, further comprising an additional ply of cords in the zone beneath the tread where the cords of said continuous ply are obliquely directed, the cords of said additional ply being crossed with respect to the oblique cords of said continuous ply.

3. A tire comprising a tread, sidewalls extending inwardly from opposite edges of said tread, beads at the inner edges of said sidewalls, bead wires in said beads, a first carcass ply of reinforcing cords extending from one bead wire, through one sidewall and beneath said tread, and a second carcass ply of reinforcing cords extending from the other bead wire, through the other sidewall and beneath the tread, the cords of each ply being non-radially directed in a zone of the sidewall adjacent to the bead, substantially radially directed in a zone of the sidewall adjacent to the tread, and oblique to the median plane of the tire beneath said tread, the cords of said plies being crossed with respect to each other beneath said tread, further comprising additional plies of cords in the sidewall zones where the cords of said first and second plies are non-radially inclined, the cords of said additional plies being crossed with respect to the cords of said first and second plies, respectively.

4. A tire comprising a tread, sidewalls extending inwardly from opposite edges of said tread, beads at the inner edges of said sidewalls, bead wires in said beads, a first carcass ply of reinforcing cords extending from one bead wire, through one sidewall and beneath the tread, and a second carcass ply of reinforcing cords extending from the other bead wire, through the other sidewall and beneath the tread, the cords of each ply being non-radially inclined in a zone of the sidewall adjacent to the bead, substantially radially directed in a zone of the sidewall adjacent to the tread, and oblique to the median plane of the tire beneath said tread, the cords of said plies being crossed with respect to each other beneath said tread, and each ply having a sidewall portion at its outer edge folded around the adjacent bead wire, the cords in each folded sidewall portion being crossed with respect to the non-radially inclined cords of said continuous ply.

References Cited

UNITED STATES PATENTS

| | | | |
|---|---|---|---|
| 3,024,828 | 3/1962 | Smith et al. | 152—354 |
| 3,062,259 | 11/1962 | Boussu et al. | 152—356 |
| 3,327,753 | 6/1967 | Travers | 152—356 |

ARTHUR L. LA POINT, Primary Examiner

CHARLES B. LYON, Assistant Examiner

U.S. Cl. X.R.

152—361